United States Patent [19]
Melzer et al.
[11] Patent Number: 4,869,603
[45] Date of Patent: Sep. 26, 1989

[54] BEARING FOR CYLINDERS OF PRINTING PRESSES AND METHOD OF MAKING IT

[75] Inventors: Rudolf Melzer, Hainburg; Gunter Tollowski, Offenbach am Main, both of Fed. Rep. of Germany

[73] Assignee: Man Roland Druckmaschinen Aktiengesellschaft, Fed. Rep. of Germany

[21] Appl. No.: 242,790

[22] Filed: Sep. 9, 1988

[30] Foreign Application Priority Data

Sep. 10, 1987 [DE] Fed. Rep. of Germany ....... 3730308

[51] Int. Cl.[4] ........................ F16C 23/02; B21D 53/10

[52] U.S. Cl. ............................ 384/255; 29/149.5 NM; 29/434; 29/460; 101/218; 101/247; 264/127; 264/261; 264/262; 384/278

[58] Field of Search .............. 29/149.5 NM, 434, 460; 101/137, 144, 145, 184, 185, 218, 247; 264/127, 261, 262; 384/255, 256, 278, 295, 296, 300, 317, 476, 493, 557, 605, 900, 905, 908

[56] References Cited

U.S. PATENT DOCUMENTS

| | | | |
|---|---|---|---|
| 2,778,303 | 1/1957 | Stempel | 101/218 |
| 2,986,086 | 5/1961 | Siebke | 101/218 |
| 3,054,346 | 9/1962 | Koch et al. | 101/247 X |
| 4,252,059 | 2/1981 | Simeth | 101/218 |

FOREIGN PATENT DOCUMENTS

| | | | |
|---|---|---|---|
| 504851 | 8/1930 | Fed. Rep. of Germany | 384/255 |
| 56-18120 | 2/1981 | Japan | 384/493 |

*Primary Examiner*—Howard N. Goldberg
*Assistant Examiner*—Andrew E. Rawlins
*Attorney, Agent, or Firm*—Leydig, Voit & Mayer

[57] ABSTRACT

To provide a snug-fitting bearing for journalling the spindle end of a printing press cylinder, a flanged bearing sleeve is disposed in a bore in the press frame and an anti-friction plastic material which compensates for the bearing play is injected into an external annular groove in the bearing sleeve of considerably less width than the depth of the bore in the press frame. Preferably, the bore is pretreated with a volatile release agent and the plastic material cures in situ to become a narrow bearing ring in the groove. The bearing sleeve may have eccentric annular shoulders on either side of the groove and a thin annular metal bushing may be interposed between the cylinder spindle and the interior of the sleeve bearing.

15 Claims, 1 Drawing Sheet

BEARING FOR CYLINDERS OF PRINTING PRESSES AND METHOD OF MAKING IT

FIELD OF THE INVENTION

The present invention relates generally to an eccentric sleeve bearing for journalling the spindle end of a cylinder of a printing press and more particularly concerns such a bearing with an annular plastic ring interposed between the sleeve bearing and a bore in the press frame.

BACKGROUND OF THE INVENTION

An eccentric sleeve bearing of the above general kind is known from U.S. Pat. No. 4,252,059 and such bearings have various advantages over more complicated roller bearing arrangements such as shown in U.S. Pat. No. 2,986,086. For instance, the cylinder bushing can be mounted in the bore of the press frame entirely without clearance and the plastic material of the bearing ring has an impact-damping effect. Also by using an anti-friction plastic material the stick-slip effect is obviated and there is reduced friction and self-lubrication of the bearing sleeve, so that servicing is reduced.

However, a disadvantage of the bearing mounting arrangement disclosed in U.S. Pat. No. 4,252,059 is that providing a clearance-free pairing between the bores in the press frame and the flanged bearing requires elaborate and very precise measuring techniques. Also, the bearing ring must be produced very accurately in the predetermined thickness dimension, something which is difficult to achieve with plastic materials. Another overriding disadvantage is that since the solid plastic bearing ring is a poor heat conductor, the heat conductivity in the whole bearing range may be impaired. This disadvantage occurs generally in the known plastic-coated round guides in which a sliding lining, for example, of curable synthetic resin, is pressed in or applied in some other way to the entire running surface of a pair of relatively rotating surfaces; generally to the shorter one of such surfaces.

SUMMARY AND OBJECTS OF THE INVENTION

It is therefore the primary aim of the present invention to provide a snug-fitting sleeve bearing for the spindle end of a printing press cylinder wherein the bearing construction is of simplified construction and easy to assemble, while also designed to ensure good heat conductivity in the bearing zone.

In accordance with the invention, a flanged bearing sleeve is disposed in a bore in the press frame and an anti-friction plastic material which compensates for the bearing play is injected into an external annular groove in the bearing sleeve of considerably less width than the depth of the bore in the press frame. Preferably, the bore is pretreated with a volatile release agent and the plastic material cures in situ to become a narrow bearing ring in the groove. The bearing sleeve may have eccentric annular shoulders on either side of the groove and a thin annular metal bushing may be interposed between the cylinder spindle and the interior of the sleeve bearing.

The bearing according to the invention has many advantages. Heat can be dissipated freely between the bearing sleeve and the press frame bore both before and after the plastic bearing ring. The printing adjustment is maintained completely satisfactorily up to a temperature difference of 5° C. between the bearing and the press frame—i.e., no variation in torque occurs. Moreover, heat expansion in the bearing does not affect the cylinder bushing and the bearing is substantially free from play even though the operating temperature has not been reached.

It is also a feature and advantage of the invention that the plastic of which the bearing ring is made provides substantial vibration damping and due to its anti-friction characteristics adequate lubrication properties are provided. Since the bearing ring material expands more than a metal bearing material such as cast iron, the cylinder bearing experiences slight prestressing at the operating temperature. This bearing, however, is unaffected by start-of-printing streaks. Last but not least, manufacture and assembly are facilitated so that the press operators themselves can provide their own flushing service.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
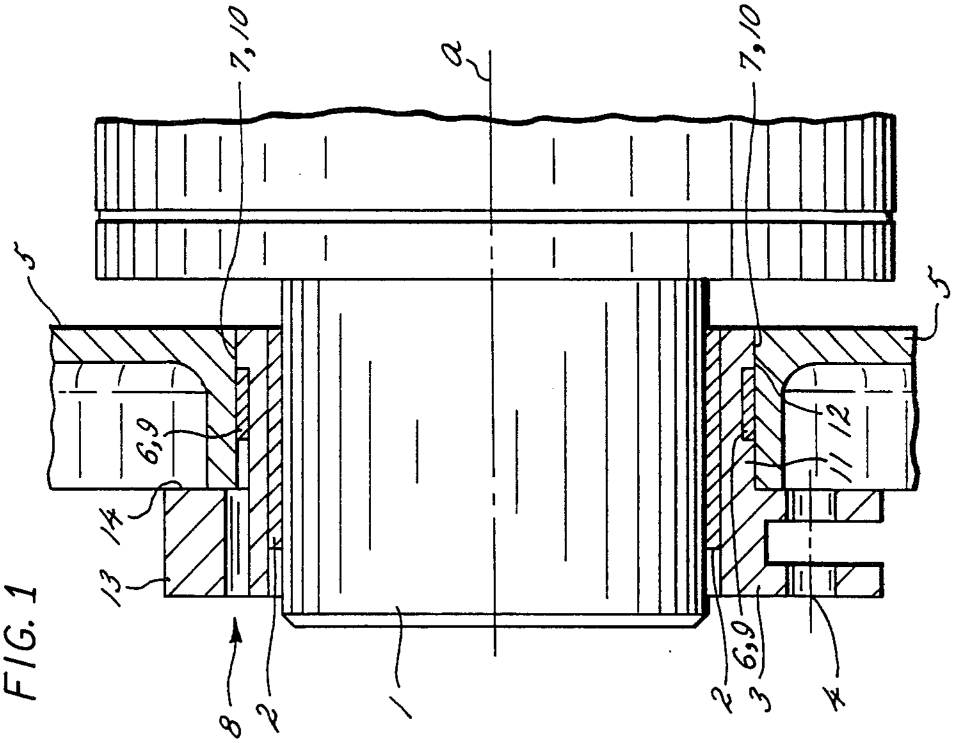
FIG. 1 is an enlarged, fragmentary side view, partly in section, showing the sleeve bearing of the present invention journalling the spindle end of a printing press cylinder in the bore of a printing press frame.
Figure 2:
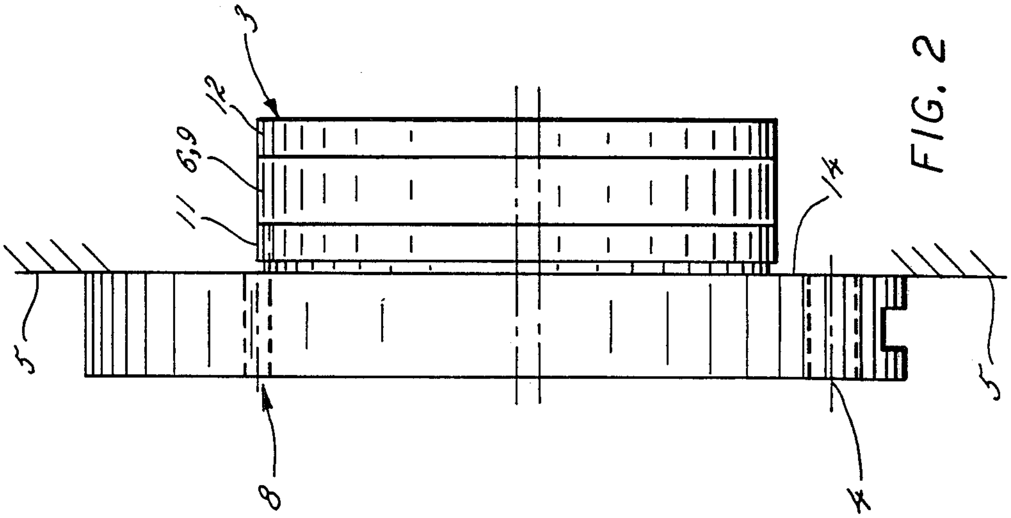
FIG. 2 is a plan view of the flanged sleeve bearing shown in FIG. 1.

Turning now to the drawings, there is shown in FIG. 1, the spindle end 1 of a printing press cylinder telescopically received in the bore 7 of the printing press frame 5 and journalled therein by an externally flanged sleeve bearing 3 inserted in the bore 7. In the preferred embodiment a thin metal bushing 2 is interposed between the cylinder spindle 1 and the interior of the sleeve bearing 3.

Pursuant to the invention, the generally cylindrical exterior surface of bearing 3 is formed in its central region with an approximately 25 mm wide annular groove 9 of a width considerably less than the depth of the bore 7. A plastic material, in paste form, is pressed into the groove 9 in the assembled state and cures in the bearing to form the finished bearing ring 6. Preferably, the bore 7 has been previously treated with a volatile release agent 10. In the illustrated embodiment, the flanged sleeve bearing 3 is formed with bores 8 extending through the flange and communicating with the groove 9 radially offset from the axis of the cylinder spindle 1 through which the pasty plastic material can be pressed in or injected. A material suitable as the pasty plastic is, for example, a curable synthetic resin for plain guides, such as polytetrafluoroethylene, commonly known as Teflon.

The method of production and operation of the novel sleeve bearing can be briefly summarized as follows:

The flanged sleeve bearing 3, which is preferably made of grey cast iron, is measured to fit in the frame bore 7 with a clearance of at least 0.001 mm and is pushed into the press frame 5. Before this occurs, the inside wall of the bore 7 in the frame 5 or in a steel bushing thereof has had a volatile release agent 10 applied to it. The pasty plastic material is then injected by way of injection bores 8 extending through the flanged sleeve bearing 3 to completely fill the annular space in the groove 9 between a pair of substantially circumferentially extending shoulders 11, 12, one located on each side of the groove 9. In the preferred embodiment, the outer flanged end 13 of the sleeve bearing 3 is formed with a substantially annular inner face 14 adapted to abut the outer surface of the press frame 5 surrounding the bore 7. The flanged bearing 3 can be drawn from the bore 7 after a curing time of approximately 8 hours and no further finishing work is needed on the diameter of the ring of anti-friction plastic material.

The result is the production in a simple manner of a flanged sleeve bearing 3 for printing press cylinder spindle 1 which, neglecting the release agent thickness of 3–4 $\mu$m, is snug-fitting in the bore, of the press frame 5. The sleeve bearing 3 is readily pivotable by way of a pivot joint 4 in the outer flanged end 13 connected to means for rotating the bearing 3 in the bore 7. The annular shoulders 11, 12 on either side of the groove 9 and plastic bearing ring 8 are preferably formed eccentric to the spindle axis and also are dimensioned for close physical and thermal relationship within the bore 7 of the frame 5. This provides for improved heat transfer and conduction between the principal bearing parts including the spindle 1, bushing 2, sleeve bearing 3 and the press frame 5 thereby equalizing the temperature therebetween and substantially reducing bearing seizures due to heat build-up and temperature differentials.

We claim as our invention:

1. A bearing construction for a spindle end of a printing press cylinder having an axis (a) journalled for rotation in a bore of a press frame, comprising in combination:

- a sleeve bearing telescopically disposed in close fitting relationship in said bore for journalling said spindle end therein;
- said sleeve bearing having a radially enlarged, flanged outer end with a substantially annular inner face adapted to abut said press frame surrounding said bore,
- a shallow annular groove formed in the outer circumferential surface of said sleeve bearing facing the inner circumferential surface of said bore,
- said groove having a width substantially less than the depth of said bore and adapted to be axially disposed substantially centrally and entirely within said bore,
- said flanged sleeve end having communicating means therein for defining a passageway into said annular groove,
- and a relatively thin annular band of anti-friction plastic material injected through said communicating means and formed in situ in said annular groove between said sleeve bearing and said bore.

2. A bearing construction as defined in claim 1 wherein said communicating means includes at least one axially extending channel formed in said flanged sleeve end and extending from the outer surface thereof to said groove in radially offset relationship to said axis of said sleeve bearing and said cylinder spindle.

3. A bearing construction as defined in claim 1 wherein said sleeve bearing is formed with a pair of substantially circumferentially extending annular external shoulders axially spaced one on either side of said groove and dimensioned for close-fitting physical and thermal relationship with the interior surface of said bore.

4. A bearing construction as defined in claim 3, wherein said external shoulders of said sleeve bearing are formed in eccentric relationship to said axis and said flanged end is formed with means for connection with means for rotating said sleeve bearing in said bore.

5. A bearing construction as defined in claim 4 including a relatively thin annular metal bushing interposed between said cylinder spindle and said sleeve bearing.

6. A bearing construction as defined in claim 5 wherein said bore has a coating of a volatile release agent.

7. A bearing construction as defined in claim 1 including a relatively thin annular metal bushing interposed between said cylinder spindle and said sleeve bearing.

8. A bearing construction as defined in claim 1 wherein said bore has a coating of a volatile release agent.

9. A method of mounting a sleeve bearing for a spindle end of a printing press cylinder having an axis (a) journalled for rotation in a bore of a press frame comprising in combination the steps of:

(a) forming said sleeve bearing with a shallow annular groove in the external circumferential surface thereof with a pair of substantially circumferentially extending annular shoulders axially spaced one on either side of said groove and dimensioned for close fitting physical and thermal relationship within said bore, (b) telescopically inserting said sleeve bearing in said bore with said groove substantially axially centered therein, (c) injecting anti-friction plastic material through a passageway in said sleeve bearing which communicates with said annular groove, (d) curing said plastic in situ to form a thin annular band of anti-friction material completely filling the space extending axially between said annular shoulders and radially between said bearing sleeve and said bore in said press frame.

10. The method of mounting a sleeve bearing as defined in claim 9 including the steps of forming said sleeve bearing with a radially enlarged, flanged outer end having a substantially annular inner face and inserting said sleeve bearing in said bore with said inner face abutting said press frame surrounding said bore.

11. The method of mounting a sleeve bearing as defined in claim 10 including the step of forming at least one axially extending channel in said flanged sleeve end extending from the outer surface thereof to said annular groove in radially offset relationship to said axis of said sleeve bearing and said cylinder spindle.

12. The method of mounting a sleeve bearing as defined in claim 11 including the step of telescopically inserting said cylinder spindle in said bearing sleeve with a relatively thin annular metal bushing interposed therebetween.

13. The method of mounting a sleeve bearing as defined in claim 9 including the step of telescopically inserting said cylinder spindle in said bearing sleeve with a relatively thin annular metal bushing interposed therebetween.

14. The method of mounting a sleeve bearing as defined in claim 9 including the step of coating the interior of said bore with a volatile release agent before said plastic material is injected through said passageway.

15. The method of mounting a sleeve bearing as defined in claim 11 including the step of coating the interior of said bore with a volatile release agent before said plastic material is injected through said passageway.

* * * * *